United States Patent
Kammachi Sreedhar et al.

(10) Patent No.: US 12,432,191 B2
(45) Date of Patent: Sep. 30, 2025

(54) METHOD AND APPARATUS FOR AUTHENTICATING AND AUTHORIZING NETWORK BASED MEDIA PROCESSING

(71) Applicant: Nokia Technologies Oy, Espoo (FI)

(72) Inventors: Kashyap Kammachi Sreedhar, Tampere (FI); Yu You, Kangasala (FI); Sujeet Shyamsundar Mate, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 361 days.

(21) Appl. No.: 17/421,566

(22) PCT Filed: Jan. 11, 2019

(86) PCT No.: PCT/FI2019/050022
§ 371 (c)(1),
(2) Date: Jul. 8, 2021

(87) PCT Pub. No.: WO2020/144396
PCT Pub. Date: Jul. 16, 2020

(65) Prior Publication Data
US 2022/0086138 A1 Mar. 17, 2022

(51) Int. Cl.
*H04L 9/40* (2022.01)
*G06F 21/33* (2013.01)
(Continued)

(52) U.S. Cl.
CPC ........ *H04L 63/0815* (2013.01); *G06F 21/335* (2013.01); *G06F 21/44* (2013.01);
(Continued)

(58) Field of Classification Search
CPC . H04L 63/0815; H04L 9/3213; H04L 9/3247; H04L 9/3273; H04L 63/0807;
(Continued)

(56) References Cited

U.S. PATENT DOCUMENTS 9,762,393 B2 * 9/2017 Soldevila .............. H04L 9/3231
9,842,596 B2 12/2017 Riedmiller et al.
(Continued)

FOREIGN PATENT DOCUMENTS

CN 104854894 A 8/2015
EP 3239877 A1 11/2017
(Continued)

OTHER PUBLICATIONS

"SAML 2.0", Wikipedia, Retrieved on Jul. 1, 2021, Webpage available at : https://en.wikipedia.org/wiki/SAML_2.0.
(Continued)

*Primary Examiner* — Cheng-Feng Huang
(74) *Attorney, Agent, or Firm* — ALSTON & BIRD LLP (57) ABSTRACT

A method and a network-based media processing source, including: generating a workflow description; generating, for a workflow manager, a container file or a manifest or a bit stream, which container file or manifest or bit stream comprises the workflow description; and including in the workflow description an authentication and authorization descriptor that defines desired authentication methods desired by the network-based media processing source for subsequent authenticating a media source to the workflow manager. The workflow manager performs: receiving from a network-based media processing source a workflow description; and determining, from the container file or a manifest or a bit stream, a workflow description that comprises an authentication and authorization descriptor that indicates desired authentication methods authenticating a media source to the workflow manager.

20 Claims, 5 Drawing Sheets

(51) Int. Cl.
| | |
|---|---|
| *G06F 21/44* | (2013.01) |
| *G06F 21/57* | (2013.01) |
| *G06F 21/62* | (2013.01) |
| *G06F 21/64* | (2013.01) |
| *H04L 9/32* | (2006.01) |
| *H04L 9/08* | (2006.01) |

(52) U.S. Cl.
CPC ............. *G06F 21/57* (2013.01); *G06F 21/62* (2013.01); *G06F 21/64* (2013.01); *H04L 9/3213* (2013.01); *H04L 9/3247* (2013.01); *H04L 63/0807* (2013.01); *H04L 63/0823* (2013.01); *H04L 9/0825* (2013.01)

(58) Field of Classification Search
CPC ... H04L 63/0823; H04L 9/0825; G06F 21/64; G06F 21/335; G06F 21/44; G06F 21/57; G06F 21/62; H04N 21/85406; H04N 21/235; H04N 21/266; H04N 21/6334
See application file for complete search history.

(56) References Cited

U.S. PATENT DOCUMENTS

| | | | |
|---|---|---|---|
| 9,906,651 B2 | 2/2018 | Lawson et al. | |
| 2005/0132207 A1 | 6/2005 | Mourad | |
| 2008/0295157 A1* | 11/2008 | Wong | H04W 12/069 726/5 |
| 2010/0146262 A1 | 6/2010 | Zhang | |
| 2011/0047373 A1* | 2/2011 | Karasawa | H04L 9/3268 713/155 |
| 2012/0174208 A1* | 7/2012 | Sperling | H04W 12/069 726/10 |
| 2012/0331293 A1 | 12/2012 | Ma et al. | |
| 2013/0097679 A1 | 4/2013 | Wong et al. | |
| 2013/0104251 A1* | 4/2013 | Moore | G06F 21/602 726/30 |
| 2013/0251189 A1 | 9/2013 | McMillan | |
| 2014/0019635 A1* | 1/2014 | Reznik | H04L 63/0428 709/231 |
| 2015/0244696 A1* | 8/2015 | Ma | H04L 9/321 726/4 |
| 2016/0182487 A1* | 6/2016 | Zhu | H04L 63/083 726/9 |
| 2016/0198202 A1 | 7/2016 | Van Brandenburg et al. | |
| 2016/0277190 A1* | 9/2016 | Soldevila | H04L 9/3231 |
| 2016/0307596 A1 | 10/2016 | Hardin et al. | |
| 2016/0366118 A1* | 12/2016 | Wang | H04L 65/65 |
| 2017/0134356 A1* | 5/2017 | Oyman | H04W 12/068 |
| 2017/0142076 A1 | 5/2017 | Ford et al. | |
| 2017/0164062 A1* | 6/2017 | Abramov | H04N 21/4524 |
| 2017/0332113 A1* | 11/2017 | Haritaoglu | H04N 21/234 |
| 2018/0069856 A1 | 3/2018 | Oyman | |
| 2018/0373847 A1 | 12/2018 | Lo et al. | |
| 2019/0018941 A1* | 1/2019 | Goto | G06F 21/40 |
| 2019/0124071 A1* | 4/2019 | Haeusler | H04L 65/403 |

FOREIGN PATENT DOCUMENTS

| | | | |
|---|---|---|---|
| EP | 3343938 A1 | 7/2018 | |
| WO | 2017/197001 A1 | 11/2017 | |

OTHER PUBLICATIONS

Park et al., "Use cases and requirements for NBMP (v4)", ISO/IEC JTC1/SC29/WG11 MPEG2018/N17502, Requirements, Apr. 2018, 31 pages.

Cheng et al., "NDMP—An Emerging MPEG Standard for Network Distributed Media Processing", IEEE Visual Communications and Image Processing (VCIP), Dec. 10-13, 2017, 4 pages.

"Information Technology—Coding of Audio-visual Objects—Part 12: ISO Base Media File Format", ISO/IEC 14496-12, Fifth Edition, Dec. 15, 2015, 248 pages.

International Search Report and Written Opinion received for corresponding Patent Cooperation Treaty Application No. PCT/FI2019/050022, dated May 8, 2019, 32 pages.

Extended European Search Report received for corresponding European Patent Application No. 19908241.3, dated Jul. 21, 2022, 12 pages.

"Information technology—Coded representation of immersive media (MPEG-I)—Part 8: Network Based Media Processing", ISO/IEC JTC1/SC29/WG11, ISO 23090-8:2018, 2018, 49 pages.

Wagenaar et al., "Unified Streaming Response NBMP", Unified Streaming Platform, MPEG-I Part 8: Network-based Media Processing, 123th MPEG meeting, 2018, 36 pages.

Wagenaar et al., "Unified Remix: a Server Side Solution for Adaptive Bit-Rate Streaming with Inserted and Edited Media Content", Proceedings of the 8th ACM on Multimedia Systems Conference, Jun. 2017, pp. 221-224.

Office action received for corresponding Chinese Patent Application No. 201980092210.9, dated Jul. 1, 2023, 11 pages of office action and 4 pages of translation available.

Office action received for corresponding Chinese Patent Application No. 201980092210.9, dated Nov. 22, 2022, 14 pages of office action and no page of translation available.

Office action received for corresponding Korean Patent Application No. 2021-7024607, dated Dec. 7, 2022, 4 pages of office action and 4 pages of translation available.

Office Action for Chinese Application No. 201980092210.9 dated Dec. 1, 2023, 6 pages.

Office Action for Korean Application No. 10-2023-7032947 dated Apr. 23, 2024, 5 pages.

Office Action for European Application No. 19908241.3 dated May 23, 2024, 6 pages.

Notice of Allowance for Chinese Application No. 201980092210.9 dated Feb. 29, 2024, 6 pages.

* cited by examiner

METHOD AND APPARATUS FOR AUTHENTICATING AND AUTHORIZING NETWORK BASED MEDIA PROCESSING

RELATED APPLICATION

This application claims priority to PCT Application No. PCT/FI2019/050022, filed on Jan. 11, 2019 which is incorporated herein by reference in its entirety.

TECHNICAL FIELD

Various example embodiments relate to authenticating and authorizing network based media processing.

BACKGROUND

This section illustrates useful background information without admission of any technique described herein representative of the state of the art.

Network-based Media Processing, NBMP, allows service providers and end users to describe media processing operations that are to be performed by the network. The NBMP system may perform: uploading of media data to the network for processing; instantiating Media Processing Entities, MPEs; configuring the MPEs for dynamic creation of media processing pipeline; and accessing the processed media data and the resulting metadata in a scalable fashion in real-time or in a deferred way.

The MPEs may be controlled and operated by a workflow manager in a NBMP platform that comprises computation resources for implementing the workflow manager and the MPEs.

The network-based processing of media separates a media sink from the media source by newly established entities, the MPEs, such that the authentication and authorizing of media use may be prejudiced or exposed to various threats in the Internet.

SUMMARY

Various aspects of examples are set out in the claims.

According to a first example aspect, there is provided method in a network-based media processing source, the method comprising:
generating a workflow description;
generating for a workflow manager a container file or a manifest, which container file or manifest comprises the workflow description; and
including in the workflow description an authentication and authorization descriptor that defines desired authentication methods desired by the network-based media processing source for subsequent authenticating a media source to the workflow manager.

The workflow manifest may be provided by a script run by a server hosting a webpage.

The network-based media processing source may have a preference order for the authentication methods.

The authentication and authorization descriptor may further indicate the preference order of the desired authentication methods.

The method may further comprise:
obtaining function specification data from a function repository; and
defining the workflow description based on the obtained function specification data.

According to a second example aspect, there is provided a method in a workflow manager for orchestrating network-based media processing, comprising:
receiving from a network-based media processing source a workflow description;
determining, from the container file or a manifest or a bit stream, a workflow description that comprises an authentication and authorization descriptor that indicates desired authentication methods authenticating a media source to the workflow manager.

The method may further comprise causing:
receiving integrity verification data from the network-based media processing source; and
verifying integrity of the received media data based on the integrity verification data.

The authentication descriptor may be indicated in a bit-stream received from the network-based media processing source. The authentication descriptor may be indicated by a container file received from the network-based media processing source. For example, the container format may use ISOBMFF as the file format. The authentication descriptor may be indicated by a manifest received from the network-based media processing source or a part of the manifest received from the network-based media processing source.

The authentication descriptor may be formatted in a JavaScript Object Notation. The authentication descriptor may be formatted in an Extensible Markup Language. The authentication descriptor may be formatted in a Session Description Protocol.

The authentication descriptor may comprise an indication of one or more desired authentication methods and the preferred order of the one or more desired authentication methods. The indication of the order of the authentication methods may be provided by one or more authentication parameters. The authentication descriptor may comprise a respective authentication parameter for each authentication method to express a respective ranking of desirability of the authentication method. Alternatively, the authentication descriptor may comprise an authentication parameter for expressing a ranking of desirability for a first group of the authentication methods while a second group formed of remaining authentication methods have a default ranking of desirability. The indication of the order of the authentication methods may be shown using an ordered linear data structure to convey the authentication methods, such as an ordered list or set.

The computer program code may be further configured, when executed by the processing function, to cause:
receiving integrity verification data from the network-based media processing source; and
verifying integrity of the received media data based on the integrity verification data.

The verification data may be received with the authentication and authorization signaling from the network-based media processing source.

The verification data may comprise a digital digest. The digital digest may be computed by a hash function. An indication of the hash function (e.g. MD5, SHA) may be signaled together with the digital digest.

The verification data may comprise a digital signature. The signature may be encrypted using the private key of an asymmetric key pair, which may come from the network based media processing system or from an external authority.

The workflow manager may be configured to operate with a separate session for each media data transporting session. The workflow manager may be configured to instantiate and configure the media processing entities and tasks separately for each session. The authentication and authorization signaling may be session specific.

The computer program code may be further configured, when executed by the processing function, to cause:
authenticating mutually communicating tasks to each other.

The configuring the task to authorize the task to the obtain the media data from the media source of the network-based media processing source may comprise using information received in the authentication and authorization signaling.

The configuring the media processing entity to authorize the using of the media source of the network-based media processing source may comprise configuring the media processing entity to obtain authorization information from an external identity provider.

The authentication descriptor may comprise an indication of a single sign-on method as the authentication method.

The authentication descriptor may comprise an indication of a single sign-on method as the authentication method.

The authentication descriptor may comprise an indication of a certificate authority, CA, certificate as the authentication method.

The authentication descriptor may comprise an Identity Provider, IDP, URL of an authentication token for authentication and authenticity.

The authentication descriptor may comprise an Identity Provider, IDP, URL template for use in generating the URL of an authentication token.

The authentication descriptor may comprise a length of an authentication token.

The authentication descriptor may comprise a signed authentication token.

The authentication descriptor may comprise a definition of a time period of the media source for which the authentication token is applicable. The period may be measured in terms of time or in terms of amount of data, such as a length of a data segment to which the authentication token applies.

The authentication descriptor may comprise an authentication token lifetime indication. The authentication token lifetime indication may indicate a validity period of the token.

The authentication descriptor may comprise an associated media stream indication for a media stream for which the authentication token is associated to.

According to a third example aspect, there is provided a network-based media processing source, comprising:
a processing function; and
a memory function configured to store computer program code that is configured, when executed by the processing function, to cause the network-based media processing source to perform the method of the first example aspect.

According to a third example aspect, there is provided a workflow manager for orchestrating network-based media processing, comprising:
a processing function; and
a memory function configured to store computer program code that is configured, when executed by the processing function, to cause the network-based media processing source to perform the method of the second example aspect.

According to a fourth example aspect, there is provided a system comprising the workflow manager of the third example aspect and at least one of:
a first stream bridge configured to receiving streaming data from the media source with a first transport protocol to supply the received streaming data to the media processing task with a second transport protocol; and
a second stream bridge configured to receiving streaming data from the media processing entity with a third transport protocol and to supply the received streaming data to with a fourth transport protocol to a media sink.

The second transport protocol may equal to the third transport protocol. The second transport protocol may differ from the first transport protocol. The third transport protocol may differ from the fourth transport protocol. The first and second stream bridges may be capable of inputting data with one or more different transport protocols. The first and second stream bridges may be capable of outputting data with one or more different transport protocols.

The media sink may be a terminal device. Alternatively, the media sink may be a server function. The server function may be server computer implemented. The server function may be implemented by a distributed computer system. The server function may be implemented by a computer cloud.

The processing function may comprise at least one processor. Alternatively, the processing function may comprise computer cloud computing resources configured to perform processing of data. The cloud computing resources may comprise at least one virtualized or distributed processor.

The memory function may comprise at least one memory. Alternatively, the memory function may comprise computer cloud computing resources configured to perform storing of data. The cloud computing resources may comprise at least one virtualized or distributed memory.

According to a fifth example aspect, there is provided a computer program comprising computer executable program code configured to execute the method of the first or second example aspect.

The computer program may be stored in a computer readable memory medium. The memory medium may be a non-transitory memory medium.

The network-based media processing may comprise any one or more of: linear or non-linear resolution changing in one or more directions; frame rate changing; image quality adjustment (e.g., brightness and/or contrast and/or saturation control); superimposing content onto video image (e.g., sports video enhancement); embedded text insertion or modification; advertisement insertion or changing; audio quality adjustment; audible commentary insertion or modification; adding or changing user-selectable captions; changing point of view and/or direction of view of video image; adding or changing picture-in-picture; and adding a replay optionally in slow-motion.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE DRAWINGS

For a more complete understanding of example embodiments, reference is now made to the following descriptions taken in connection with the accompanying drawings in which.

DETAILED DESCRIPTION OF THE DRAWINGS

Various example embodiments and their potential advantages are understood by referring to FIGS. 1 through 7 of the drawings. In this document, like reference signs denote like parts or steps.

Figure 1:
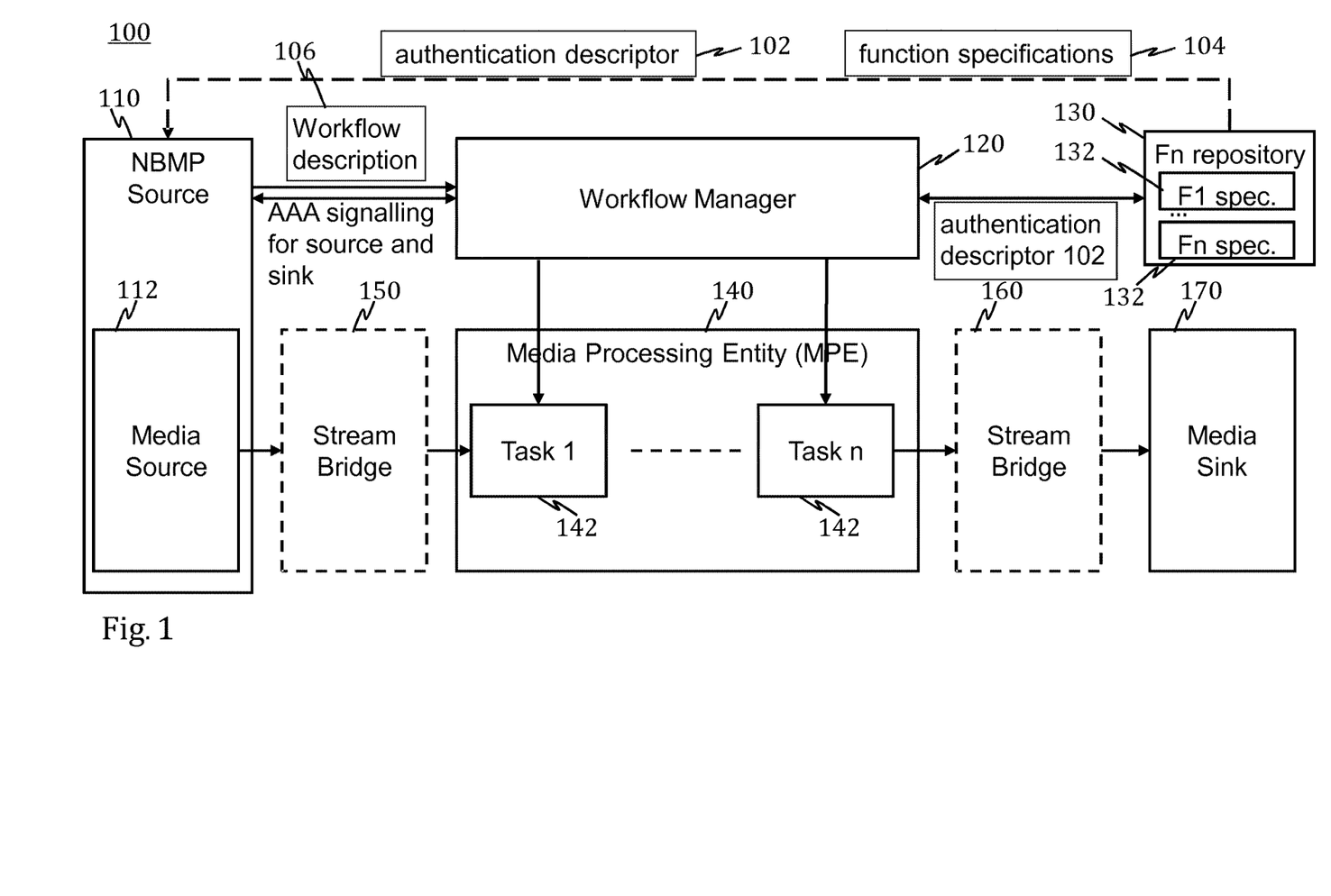
FIG. 1 shows an architectural drawing of a system of an example embodiment.

FIG. 1 shows an architectural drawing of a system 100 of an example embodiment. The system 100 comprises a Network-based Media Processing, NBMP, source 110 that has one or more media sources 112, such as video cameras. The NBMP source 110 may be controlled by a first legal entity in a first country.

The system 100 further comprises a workflow manager 120 that orchestrates the network-based media processing as will be described in detail in the following. The workflow manager 120 can be implemented with a dedicated server that may be virtualized, but also as a function in cloud computing. Hence, instead of a processor and memory, the workflow manager 120 is drawn to comprise a processing function 122 and a memory function 124 for processing and storing data. On top of these functions, the workflow manager 120 would also comprise some further functions such as a persistent storing function and a communication interface function alike various other entities herein, but such functions are not drawn in sake of brevity and simplicity of this description.

The system 100 further comprises a function repository 130. In an example embodiment, the function repository 130 is a network based function. In an example embodiment, the function repository 130 stores a plurality of function specifications 132 for use by the workflow manager 120 in defining tasks to a media processing entity 140.

In an example embodiment, the media processing entity 140 is a dedicated apparatus, such as a server computer. In another example embodiment, the media processing entity 140 is a function established for this purpose by the workflow manager 120 using, for example, a suitable virtualization platform or cloud computing.

The workflow manager 120 has a communicative connection with the NBMP source 110 and with the function repository 130. In an example embodiment, the function repository 130 further has a communicative connection with the NBMP source 110.

FIG. 1 further illustrates optional first and second stream bridges 150, 160, optionally interfacing the media processing entity 140 with the media source 112 and a media sink 170, respectively.

Some major signaling is indicated by arrows and text, while it should be appreciated that these signals are not exhaustively indicated and not all of those signals are necessary for all embodiments.

In an example embodiment, the function repository 130 communicates to the NBMP source 110 an authentication descriptor 102 and/or its capability indications (high-level capability indications and/or function specifications 104) for allowing the NBMP to cause the workflow manager 120 to authenticate itself for the NBMP source 110 and/or for informing the NBMP source 110 of available functions at the function repository 130 for use by the workflow manager 120.

In another example embodiment, the NBMP source 110 has no access to the function repository 130 before starting to produce a workflow description 106 for a new workflow session The NBMP source 110 provides the workflow manager 120 with a workflow description.

In an example embodiment, the NBMP source 110 provides the workflow manager 120 with authenticating and authorizing signaling (e.g., as authentication, authorizing and accounting, AAA, signaling) for use towards the media source 112 and the media sink 170. The authentication and authorization descriptor may comprise authentication, authorization and optionally also accounting related information.

An authentication description signaling is also drawn between the workflow manager 120 and the function repository 130.

The signaling and other operations in the system will be further described with reference to further drawings.

Figure 2:
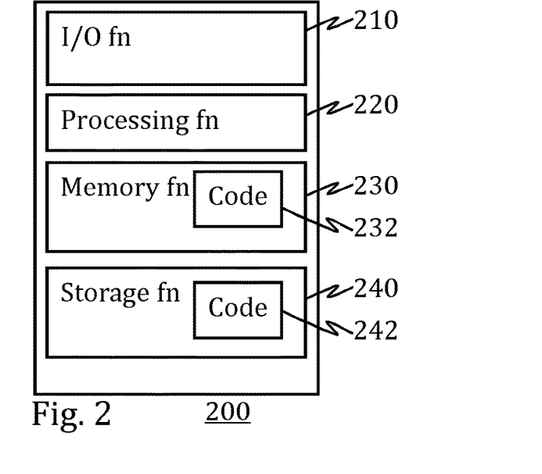
FIG. 2 shows a simplified block diagram of an apparatus of an example embodiment.

FIG. 2 shows a simplified block diagram of an apparatus 200 according to an embodiment. The apparatus 200 is drawn and described as a computer cloud implementation and it should be appreciated that one or more parts could in other implementations use dedicated elements, whether singular or distributed or virtualized.

The apparatus 200 comprises an input/output function 210. The input/output function 210 may comprise one or more communication circuitries, virtualized functions and/or cloud computing functions, configured to input and output data. The input and output functions may be commonly or separately implemented.

The apparatus 200 further comprises a processing function 220, which may comprise one or more processors, processing circuitries, virtualized functions and/or cloud computing functions. The processing function 220 is responsible for controlling the at least such operations of the apparatus 200 that are relevant for some embodiments of this document, while some other operations of the apparatus 200 can be controlled by further circuitries.

The apparatus 200 further comprises a memory function 230, which can be provided with computer program code 232, e.g., on starting of the apparatus 200 and/or during the operation of the apparatus 200. The program code 232 may comprise applications, one or more operating systems, device drivers, code library files, device drivers and other computer executable instructions. The memory function 230 can be implemented using one or more memory circuitries, virtual resources of a virtualization environment and/or cloud computing resources.

The apparatus 200 further comprises a storage function 240, which can be provided with computer program code 242 and other data to be stored. Some or all of the program code 242 may be transferred to the memory function 230 from the storage function 240. The storage function 240 can be implemented using one or more storage circuitries, hard drives, optical storages, magnetic storages, virtual resources of a virtualization environment and/or cloud computing resources.

Figure 3:
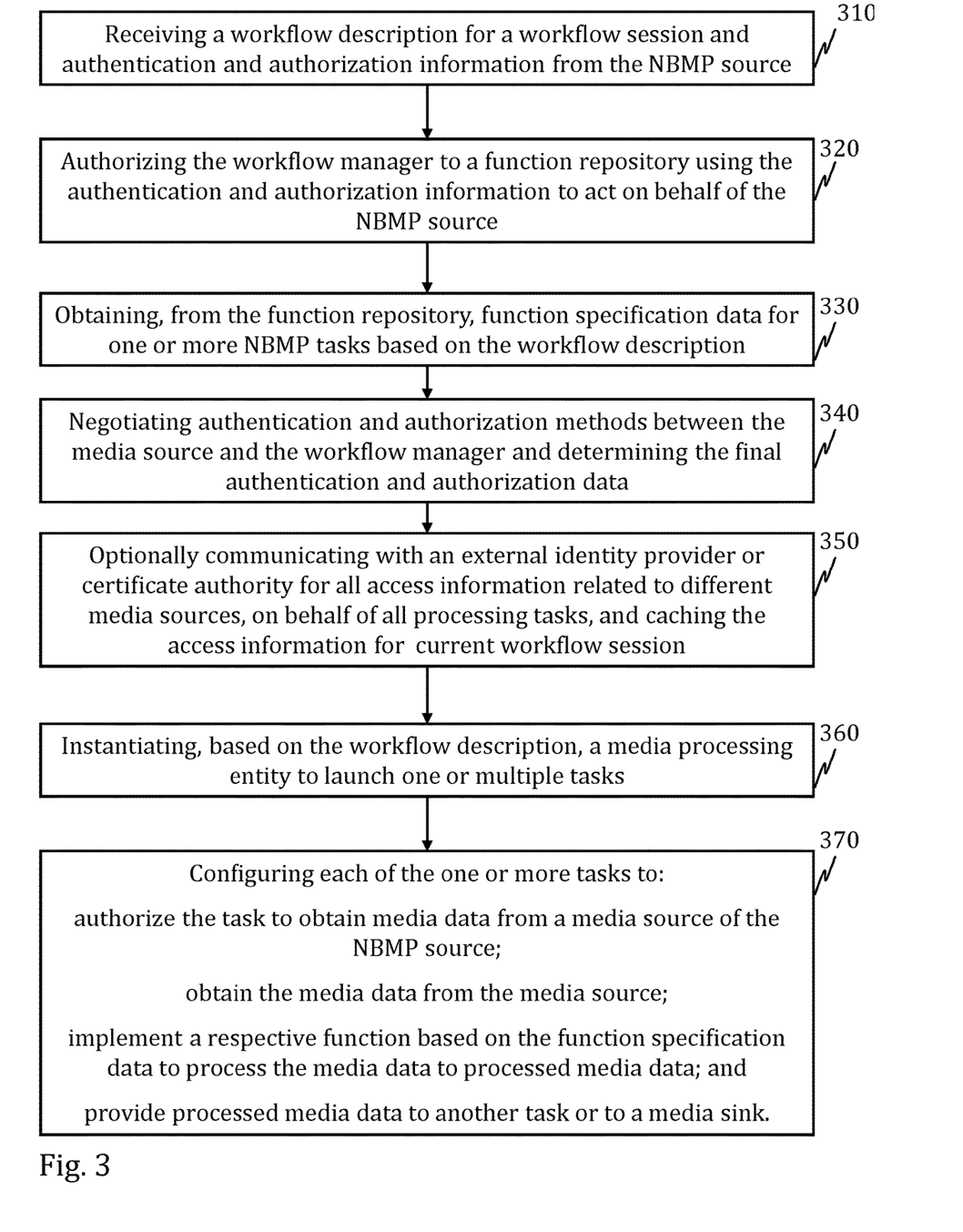
FIG. 3 shows a flow chart of a process of an example embodiment in which there is no pre-access to a function repository.

FIG. 3 shows a flow chart illustrating a process in the work flow manager 120 of an example embodiment in which there is no pre-access to the function repository 130 by the NBMP source 110. The process comprises:

310. receiving a workflow description for a workflow session and authentication and authorization information from the NBMP source 110, e.g. in a container file or a manifest or a bit stream;
320. authorizing the workflow manager 120 to the function repository 130 using the authentication and authorization information to act on behalf of the NBMP source 110;
330. obtaining, from the function repository 130, function specification data 132 for one or more NBMP tasks 142 based on the workflow description;
340. negotiating authentication and authorization methods between the media source 112 and the workflow manager 120 and determining the final authentication and authorization data;
350. optionally communicating (if needed and supported by implementation) with an external identity provider or certificate authority for all access information related to a plurality of different media sources 112, on behalf of all NBMP tasks 142, and caching the access information for the current workflow session;
360. instantiating, based on the workflow description, the media processing entity 140 to launch one or multiple NBMP tasks 142; and
380. configuring each of the one or more NBMP tasks 142 to:
authorize the NBMP task 142 to obtain media data from the media source 112 of the network-based media processing source 110;
obtain the media data from the media source 112;
implement a respective function based on the function specification data 142 to process the media data to processed media data; and
provide the processed media data to another task 142 or to a media sink 170.

In an example embodiment, the authentication and authorization signaling from the NBMP source 110 comprises the authentication descriptor 102. In an example embodiment, the authentication descriptor 102 is indicated in a bit-stream received from the network-based media processing source. In an example embodiment, the AAA signaling is provided before media data bit stream in a leading part of the media bit stream, e.g. MPEG-2 Transport stream.

In an example embodiment, the authentication descriptor 102 is indicated by a container file received from the network-based media processing source 110. For example, the container format may use ISOBMFF, ISO base media file format (ISO/IEC 14496-12—MPEG-4 Part 12), as the file format.

In an example embodiment, the authentication descriptor 102 is indicated by a manifest received from the network-based media processing source 110 or a part of the manifest received from the network-based media processing source 110.

In an example embodiment, the authentication descriptor 102 is formatted in any one of: a JavaScript Object Notation; an Extensible Markup Language; and a Session Description Protocol.

In an example embodiment, the authentication descriptor 102 comprises an indication of one or more desired authentication methods and the preferred order of the one or more desired authentication methods. In an example embodiment, the, indication of the order of the authentication methods is provided by one or more authentication parameters. In an example embodiment, the authentication descriptor 102 comprises a respective authentication parameter for each authentication method to express a respective ranking of desirability of the authentication method. In an example embodiment, the authentication descriptor 102 comprises an authentication parameter for expressing a ranking of desirability for a first group of the authentication methods while a second group formed of remaining authentication methods have a default ranking of desirability. In an example embodiment, the indication of the order of the authentication methods is shown using an ordered linear data structure to convey the authentication methods, such as an ordered list or set.

In an example embodiment, the computer program code 232 is further configured, when executed by the processing function 220, to cause:
receiving integrity verification data from the network-based media processing source; and
verifying integrity of the received media data based on the integrity verification data.

In an example embodiment, the verification data is received with the authentication and authorization signaling from the network-based media processing source 110.

In an example embodiment, verification data comprises a digital digest. In an example embodiment, the digital digest is computed by a hash function. In an example embodiment, an indication of the hash function (e.g. MD5, SHA) is signaled together with the digital digest.

In an example embodiment, the verification data comprises a digital signature. In an example embodiment, the signature is encrypted using the private key of an asymmetric key pair, which comes from the network based media processing system or from an external authority. In an example embodiment, the workflow manager is configured to operate with a separate session for each media data transporting session.

In an example embodiment, the workflow manager 120 is configured to instantiate and configure the media processing entities and tasks separately for each session. In an example embodiment, the authentication and authorization signaling is session specific.

In an example embodiment, the computer program code is further configured, when executed by the processing function, to cause: authenticating mutually communicating tasks to each other.

The configuring the task to authorize the task to the obtain the media data from the media source 112 of the network-based media processing source 110 comprises using information received in the authentication and authorization signaling.

In an example embodiment, the configuring the media processing entity to authorize the using of the media source of the network-based media processing source comprises configuring the media processing entity to obtain authorization information from an external identity provider.

In an example embodiment, the authentication descriptor 102 comprises an indication of a single sign-on method as the authentication method.

In an example embodiment, the authentication descriptor 102 comprises an indication of a single sign-on method as the authentication method.

In an example embodiment, the authentication descriptor 102 comprises an indication of a certificate authority, CA, certificate as the authentication method.

In an example embodiment, the, authentication descriptor 102 comprises an Identity Provider, IDP, URL of an authentication token for authentication and authenticity.

In an example embodiment, the authentication descriptor 102 comprises an Identity Provider, IDP, URL template for use in generating the URL of an authentication token.

In an example embodiment, the authentication descriptor 102 comprises a length of an authentication token.

In an example embodiment, the authentication descriptor 102 comprises a signed authentication token.

In an example embodiment, the authentication descriptor 102 comprises a definition of a time period of the media source for which the authentication token is applicable. In an example embodiment, the period is measured in terms of time or in terms of amount of data, such as a length of a data segment to which the authentication token applies.

In an example embodiment, the authentication descriptor 102 comprises an authentication token lifetime indication. In an example embodiment, the authentication token lifetime indication indicates a validity period of the token.

In an example embodiment, the authentication descriptor 102 comprises an associated media stream indication for a media stream for which the authentication token is associated to.

In an example embodiment, there is provided a system comprising the workflow manager 120 and at least one of:
  a first stream bridge 150 configured to receiving streaming data from the media source 112 with a first transport protocol to supply the received streaming data to the media processing task 142 with a second transport protocol; and
  a second stream bridge 160 configured to receiving streaming data from the media processing task 142 with a third transport protocol and to supply the received streaming data to with a fourth transport protocol to a media sink.

Any of the first to fourth transport protocols may comprise any one of Real Time Streaming Protocol, RTSP; Real-Time Messaging Protocol, RTMP; Web Real-Time Communication, WebRTC; Dynamic Adaptive Streaming over HTTP; DASH; HTTP Live Streaming, HLS; Advanced Message Queuing Protocol AMQP; Message Queuing Telemetry Transport, MQTT; Streaming Text-Orientated Messaging Protocol, STOMP; and Hypertext Transfer Protocol Secure, HTTPS.

In an example embodiment, the media sink 170 is a terminal device such as an internet connectable computer or mobile phone. In an example embodiment, the media sink 170 is a server function. In an example embodiment, the server function is server computer implemented. In an example embodiment, the server function is implemented by a distributed computer system. In an example embodiment, the server function is implemented by a computer cloud.

In an example embodiment, various media processing functions are defined in the form of functional specification or function specification 132. In an example embodiment, the function specification includes an authentication description, optionally with a preference order or a preference order parameters.

In an example embodiment, the NBMP source 110 uses a function discovery API to query the media processing functions of the function repository 130 or a plurality of function repositories and parses the authentication descriptions of the returned functions. In an example embodiment, the Media Source 112 provides a workflow description to the Workflow Manager to create instances of the functions, that is, the media processing tasks (the Tasks) with filled details of the authentication information.

Figure 4:
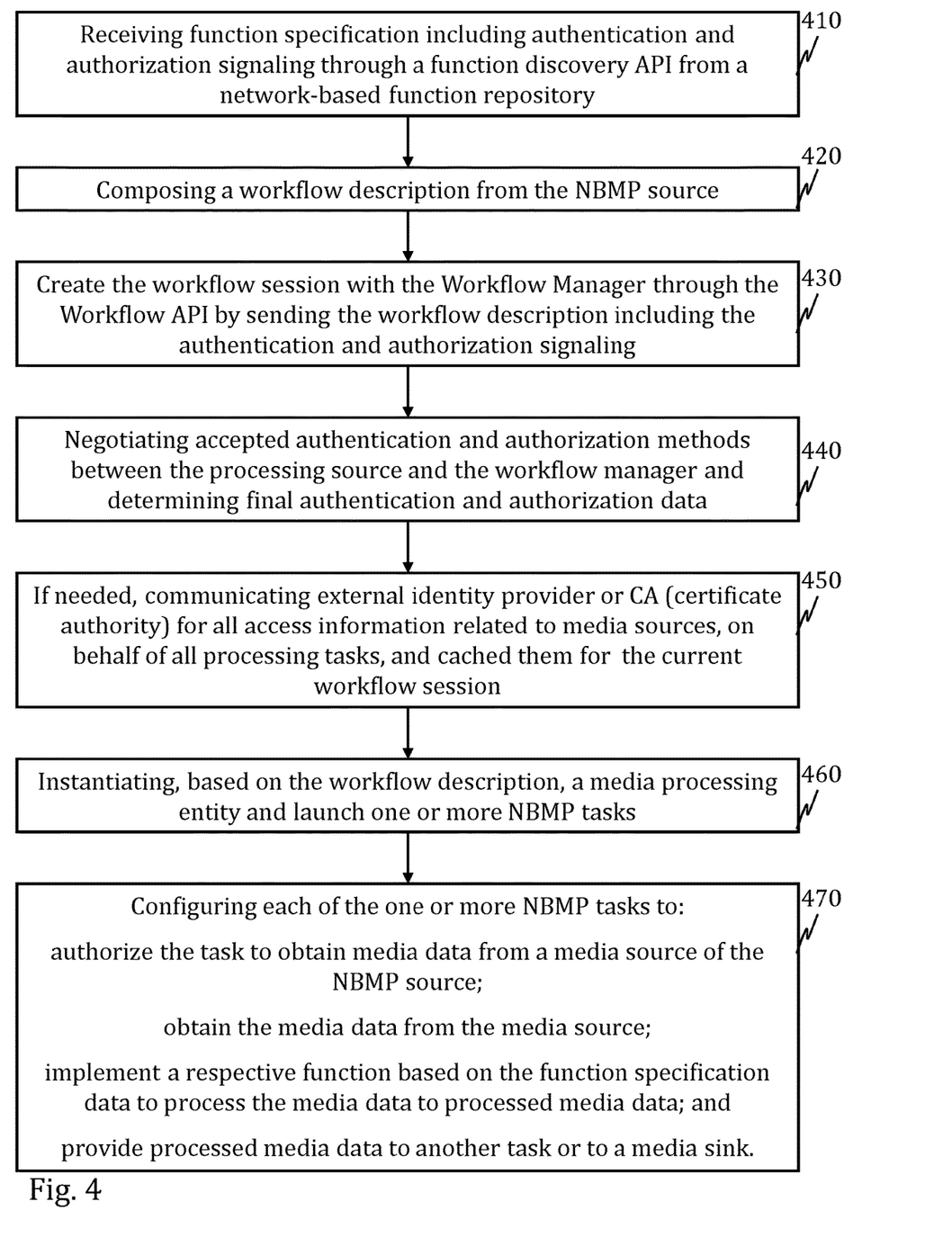
FIG. 4 shows a flow chart of a process of an example embodiment in which there is a pre-access to the function repository.

FIG. 4 shows a flow chart of a process of an example embodiment in which there is a pre-access to the function repository. The process comprises:
  410. receiving function specification including authentication and authorization signaling through a function discovery API from the network-based function repository 130;
  420. composing a workflow description from the NBMP source 110;
  430. creating the workflow session with the Workflow Manager 120 through a workflow API, for example, by sending the workflow description including the authentication and authorization signaling;
  440. negotiating accepted authentication and authorization methods between the NBMP source 110 and the workflow manager 120 and determining final authentication and authorization data;
  450. if needed, communicating external identity provider or CA (certificate authority) for all access information related to media sources, on behalf of all processing tasks, and cached them for the current workflow session;
  460. instantiating, based on the workflow description, the media processing entity 140 and launching one or more NBMP tasks 142;
  470. Configuring each of the one or more NBMP tasks to:
  authorize the task to obtain media data from a media source of the NBMP source;
  obtain the media data from the media source;
  implement a respective function based on the function specification data to process the media data to processed media data; and
  provide processed media data to another task or to a media sink.

Figure 5:
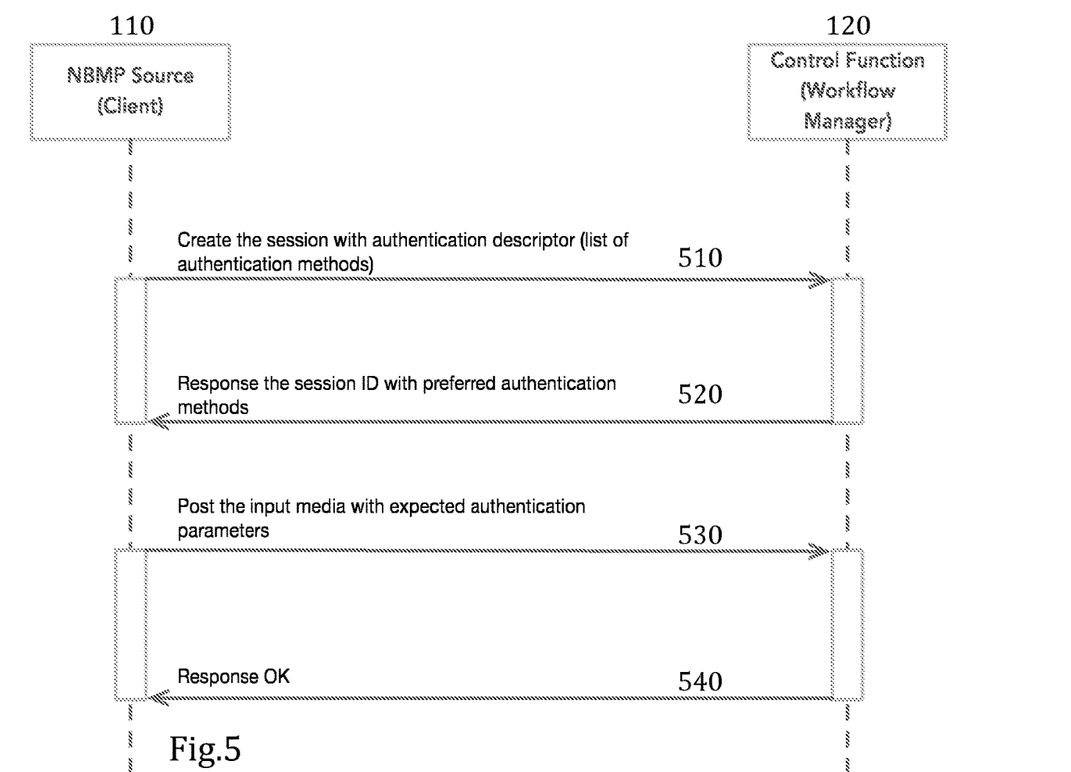
FIG. 5 shows a signaling chart of an example embodiment.

FIG. 5 shows a signaling chart of an example embodiment. The NBMP source 110 creates a workflow session with the authentication descriptor 102 and sends that to the workflow manager 120 in 510. The workflow manager 120 responds a session ID with preferred authentication methods in 520. The NBMP source 110 posts from the media source 112 input media data with expected authentication parameters in 530. The workflow manager 120 acknowledges the authentication and posted input media by a response OK message in 540.

Figure 6:
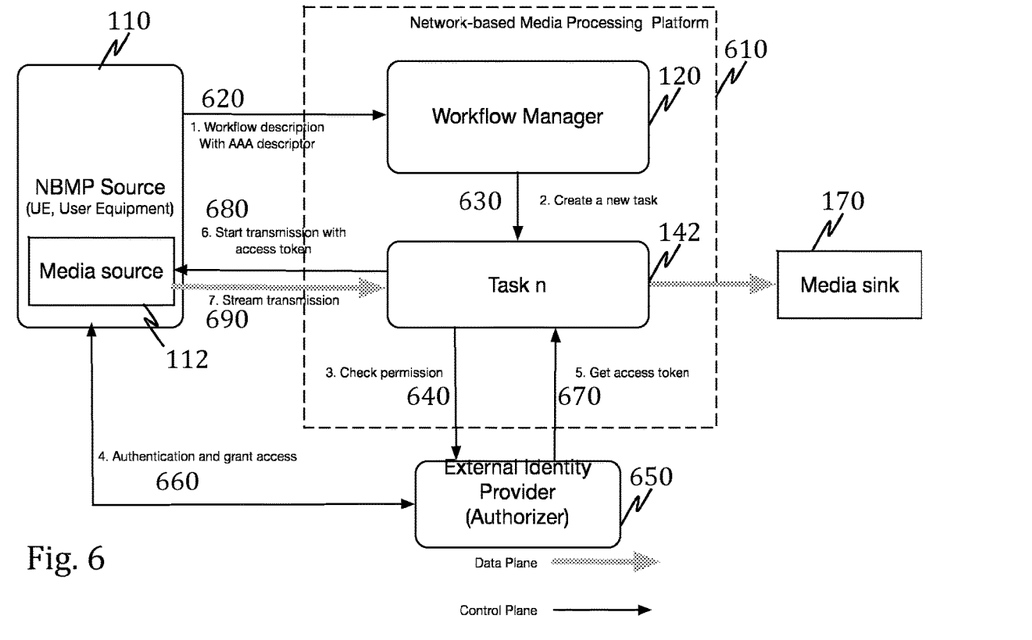
FIG. 6 shows a flow chart for a single sign-on embodiment.

FIG. 6 shows a flow chart for a single sign-on embodiment. In this embodiment, it a client or NBMP source 110 plans 620 a NBMP video transcoding job (a NBMP workflow) for a NBMP platform 610 hosted in the Cloud A to be executed in a workflow session. The video source (media source 112) may be a protected or unprotected resource. The video source may be with or without an authentication token. The authentication descriptor may comprise or be the authentication token. The video source may be hosted in a Cloud B that may be controlled by a different legal entity than Cloud A. Clouds A and B may lack a trust relationship.

The workflow manager 120 creates 630 a new NBMP task 142 to a media processing entity. The NBMP task requests 640 a new access token with permissions from the authorizer of the video provider, e.g., on creating a new task 142, with the client's credentials and (optionally) a unique identity of the NBMP service (e.g. a hash string). At this stage, the authorizer checks the permission of the NBMP task 142 for accessing the media source 112.

The task requests an authorizer 640 of the Cloud B for an access token can be performed with different access types (one time/multi-time/permeant etc.), unbound or bound to the NBMP service.

The authorizer 640 communicates with the NBMP source 110 to authenticate and grant requested access to the media source 112 if the authentication and authorization description has provided acceptable authorization data to the task 142 in step 660. If access is granted, the task 142 gets an access token in 670.

The NBMP source 110 or in some embodiments the media source 112 receives 680 a request with the access token to start transmission of the media data from the media source 112. In response, the NBMP source 110 or the media source 112 verifies the access token and starts delivering 690 the media data to the NBMP task 142, e.g., by streaming.

The access token may define the media source. The media source may be associated with an input descriptor that is unique at least in the NBMP source 110 while the access token is valid. The workflow description may comprise the input descriptor. The workflow description may comprise the input descriptor or a derivative of the input descriptor.

Figure 7:
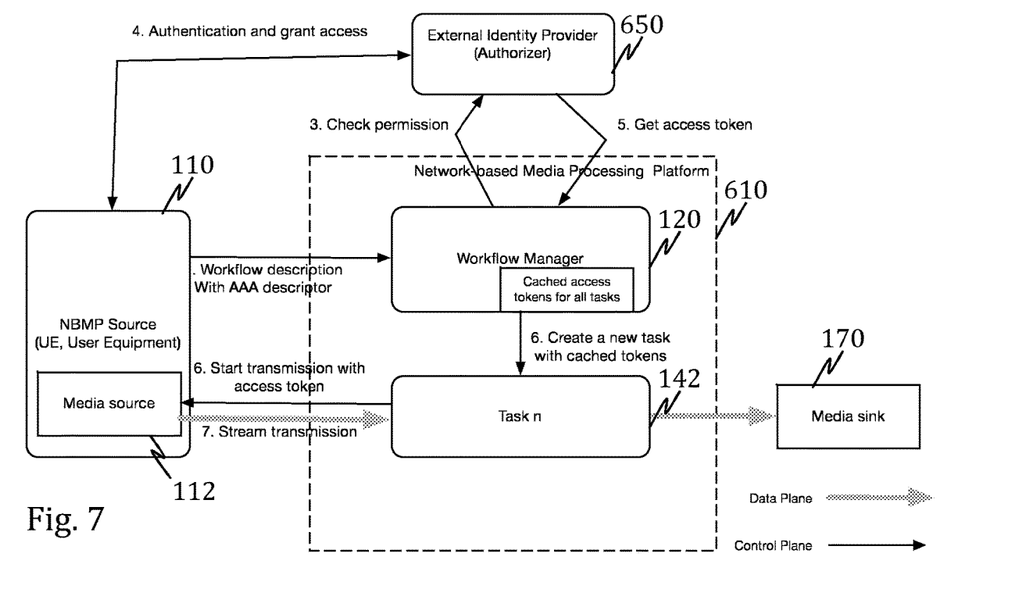
FIG. 7 shows a flow chart for another single sign-on embodiment.

In FIG. 6, the external identity provider 650 may arrange access to the media source 112 without providing the task 142 with persistent authorization data of the NBMP source 110 or the media source 112. FIG. 7 shows an example embodiment in which the workflow manager 120 interfaces with the external identity provider or authorizer 650. In this case, it is not the NBMP task 142 but the workflow manager 120 that obtains the access token from the authorizer 650 based on the authentication and authorization description received from the NBMP source 110. In FIG. 7 embodiment, the workflow manager 120 caches access tokens for all of the NBMP tasks 142 used in one or more workflow sessions, creates or reconfigures earlier created NBMP tasks 142 with the cached access tokens so that the tasks can use the access tokens to gain access to the media source. The access tokens are also used in one embodiment for authorizing the NBMP tasks 142 to access each other. In an example embodiment, the NBMP tasks 142 exchange one-way hashed authenticators formed of data comprising at least one seed item of each other, such as a time stamp, identifier or random code received from the another NBMP task 142. In this manner, the NBMP tasks 142 can verify the possession of the shared access token without exposing the access token. Same or similar mechanism can also be employed in obtaining access to the media data of the media source 112.

In an example embodiment, the workflow manager 120 is configured to operate as in FIG. 1 or as in FIG. 6 or as in FIG. 7 depending on the workflow description so same reference sign 120 is used in each of these drawings. In an example embodiment, the workflow manager is only capable operating as in FIG. 1 or as in FIG. 6 or as in FIG. 7 or as in FIGS. 1 and 6 or as in FIGS. 1 and 7 or as in FIGS. 6 and 7.

Any processor of this document may comprise, for example, any one or more of: a master control unit (MCU); a microprocessor; a digital signal processor (DSP); an application specific integrated circuit (ASIC); a field programmable gate array; and a microcontroller.

As used in this application, the term "circuitry" may refer to one or more or all of the following:
 (a) hardware-only circuit implementations (such as implementations in only analog and/or digital circuitry) and;
 (b) combinations of hardware circuits and software, such as (as applicable):
  (i) a combination of analog and/or digital hardware circuit(s) with software/firmware; and
  (ii) any portions of hardware processor(s) with software (including digital signal processor(s)), software, and memory(ies) that work together to cause an apparatus, such as a mobile phone or server, to perform various functions); and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Without in any way limiting the scope, interpretation, or application of the claims appearing below, a technical effect of one or more of the example embodiments disclosed herein is that an NBMP source can be allowed to initiate network-based media processing using third-party function based tasks running in a cloud operated by yet another vendor with efficient and flexible authentication and authorization. Another technical effect of one or more of the example embodiments disclosed herein is that authentication and authorization can be deployed in a network based media processing system without exposing private AAA secrets of one party to other parties.

Various embodiments may be implemented in software, hardware, application logic or a combination of software, hardware and application logic. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the before-described functions may be optional or may be combined.

Although various aspects are set out in the independent claims, other aspects comprise other combinations of features from the described embodiments and/or the dependent claims with the features of the independent claims, and not solely the combinations explicitly set out in the claims.

It is also noted herein that while the foregoing describes example embodiments, these descriptions should not be viewed in a limiting sense. Rather, there are several variations and modifications which may be made without departing from the scope of the present document.

The invention claimed is:

1. An apparatus comprising at least one processor; and at least one memory including computer program code; the at least one memory and the computer program code configured to, with the at least one processor, cause the apparatus at least to perform:
   generate a workflow description;
   generate, for a workflow manager, a container file or a manifest or a bit stream, which container file or manifest or bit stream comprises the workflow description; and
   include in the workflow description an authentication and authorization descriptor that defines desired authentication methods desired by a network-based media processing source for subsequently authenticating a media source to the workflow manager, wherein the authentication and authorization descriptor comprises an authentication parameter for expressing a ranking of desirability for a first group comprising the desired authentication methods from among a plurality of authentication methods while a second group of remaining authentication methods from the plurality of authentication methods, different than the first group, has a default ranking of desirability.

2. The apparatus of claim 1, wherein the network-based media processing source has a preference order for the authentication methods, and wherein the authentication and authorization descriptor further indicates the preference order of the desired authentication methods.

3. The apparatus of claim 1, further configured to perform:
   obtain function specification data from a function repository; and
   define the workflow description based on the obtained function specification data.

4. The apparatus of claim 1, further configured to provide a workflow manifest by a web-page server script.

5. The apparatus of claim 1, wherein the authentication and authorization descriptor is formatted in a JavaScript Object Notation.

6. The apparatus of claim 1, wherein the authentication and authorization descriptor is formatted in an Extensible Markup Language.

7. The apparatus of claim 1, wherein the authentication and authorization descriptor is formatted in a Session Description Protocol.

8. The apparatus of claim 1, wherein the authentication descriptor comprises an indication of a single sign-on method as the authentication method.

9. The apparatus of claim 1, wherein the authentication and authorization descriptor further comprises (i) a signed authentication token and (ii) a time period of the media source for which the authentication token is applicable.

10. The apparatus of claim 1, further configured to perform:
    receive a workflow session, from the network-based media processing source, generated based on the authentication and authorization descriptor;
    transmit, to the network-based media processing source, a session identifier comprising the desired authentication methods;
    receive, from the network-based media processing source, input media data using one or more of the desired authentication methods; and
    transmit an acknowledgement message to the network-based media processing source.

11. An apparatus comprising at least one processor; and at least one memory including computer program code; the at least one memory and the computer program code configured to, with the at least one processor, cause the apparatus at least to perform:
    receive from a network-based media processing source a workflow description; and
    determine, from a container file or a manifest or a bit stream, the workflow description that comprises an authentication and authorization descriptor that indicates desired authentication methods for authenticating a media source to a workflow manager, wherein the authentication and authorization descriptor comprises an authentication parameter for expressing a ranking of desirability for a first group comprising the desired authentication methods from among a plurality of authentication methods while a second group of remaining authentication methods from the plurality of authentication methods, different than the first group, has a default ranking of desirability.

12. The apparatus of claim 11, wherein the authentication and authorization descriptor further indicates a preference order of the desired authentication methods for the network-based media processing source.

13. The apparatus of claim 11, further configured to perform:
    use the authentication and authorization descriptor to authorize the workflow manager to a function repository, for acting on behalf of the network-based media processing source; and
    obtain, based on the workflow description, function specification data from a function repository for one or more network-based media processing tasks.

14. The apparatus of claim 13, further configured to use the function specification data and the workflow description to instantiate the one or more network-based media processing tasks.

15. The apparatus of claim 13, further configured to choose the authentication methods for the network-based media processing tasks based on the function specification data.

16. The apparatus of claim 11, further configured to perform:
    receive integrity verification data from the network-based media processing source; and
    verify integrity of the received media data based on the integrity verification data.

17. The apparatus of claim 16, wherein the verification data is received with the authentication and authorization descriptor from the network-based media processing source.

18. The apparatus of claim 16, wherein the verification data comprises a digital digest.

19. A method in a network-based media processing source, the method comprising:
    generating a workflow description;
    generating, for a workflow manager, a container file or a manifest or a bit stream, which container file or manifest or bit stream comprises the workflow description; and
    including in the workflow description an authentication and authorization descriptor that defines desired authentication methods desired by the network-based media processing source for subsequently authenticating a media source to the workflow manager, wherein the authentication and authorization descriptor comprises an authentication parameter for expressing a ranking of desirability for a first group comprising the desired authentication methods from among a plurality of authentication methods while a second group of remaining authentication methods from the plurality of authentication methods, different than the first group, has a default ranking of desirability.

20. A method in a workflow manager for orchestrating network-based media processing, the method comprising:

receiving from a network-based media processing source a workflow description; and determining, from a container file or a manifest or a bit stream, the workflow description that comprises an authentication and authorization descriptor that indicates desired authentication methods for authenticating a media source to the workflow manager, wherein the authentication and authorization descriptor comprises an authentication parameter for expressing a ranking of desirability for a first group comprising the desired authentication methods from among a plurality of authentication methods while a second group of remaining authentication methods from the plurality of authentication methods, different than the first group, has a default ranking of desirability.

* * * * *